UNITED STATES PATENT OFFICE.

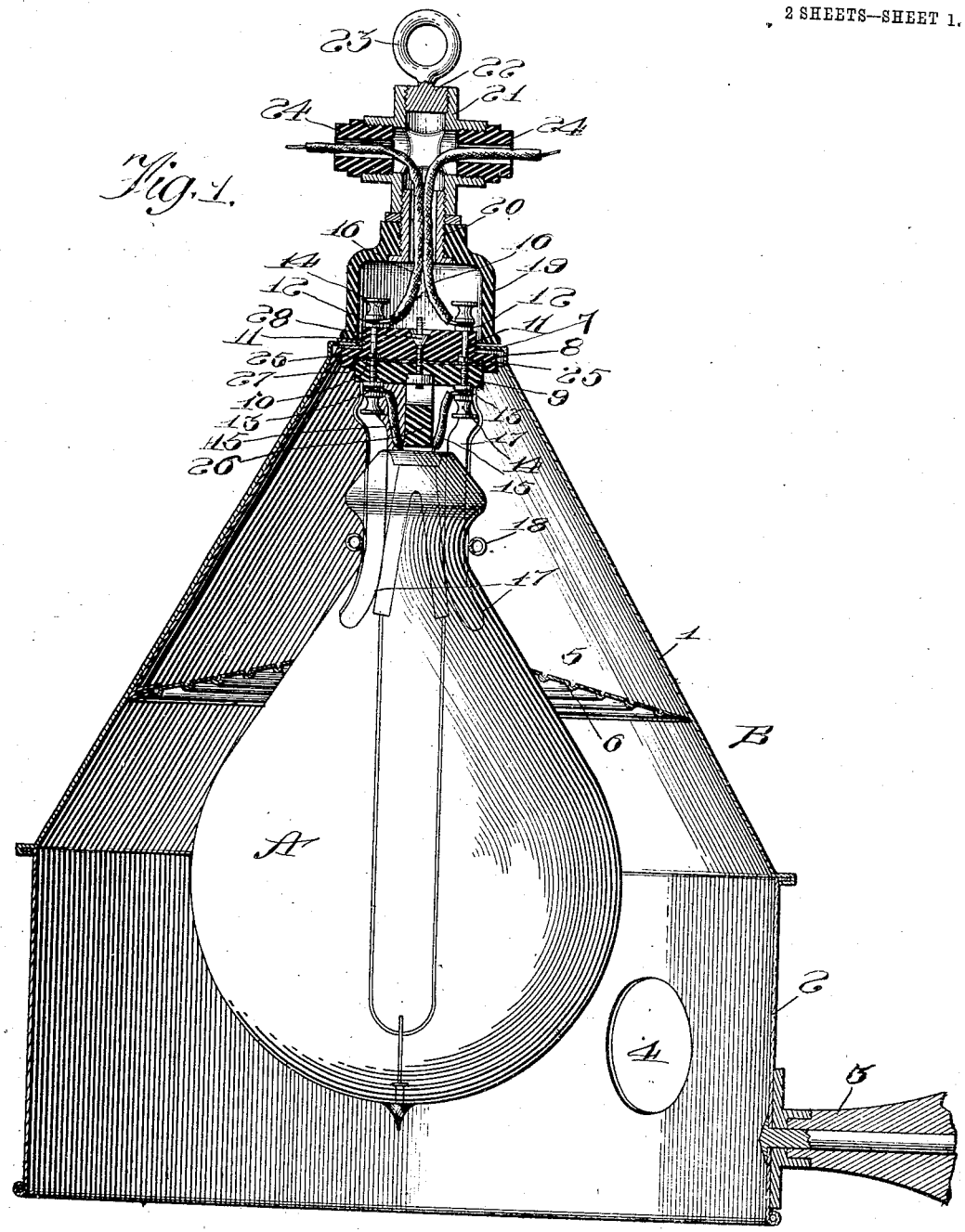

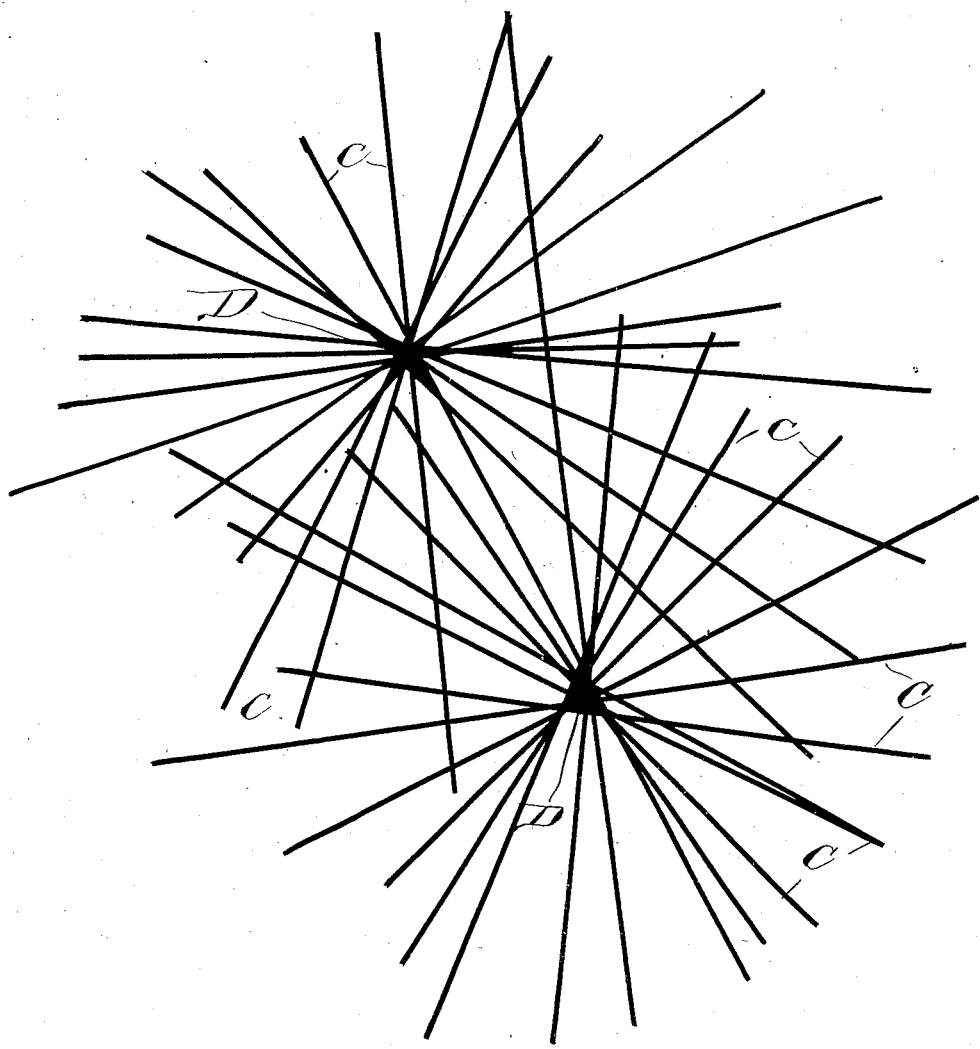

CORYDON E. ROGERS, OF SEATTLE, WASHINGTON, ASSIGNOR, BY MESNE ASSIGNMENTS, TO THE ROGERS THERAPEUTIC LAMP COMPANY, OF PHŒNIX, ARIZONA TERRITORY, A CORPORATION OF ARIZONA TERRITORY.

MEANS FOR PRODUCING AND UTILIZING RAYS OF LIGHT FOR THERAPEUTIC PURPOSES.

No. 894,166.        Specification of Letters Patent.        Patented July 21, 1908.

Continuation of abandoned application Serial No. 143,642, filed February 16, 1903. This application filed March 7, 1905. Serial No. 243,924.

*To all whom it may concern:*

Be it known that I, CORYDON E. ROGERS, a citizen of the United States, residing at Seattle, in the county of King and State of Washington, have invented certain new and useful Improvements in Means for Producing and Utilizing Rays of Light for Therapeutic Purposes, of which the following is a specification.

This application is filed as a continuation of, and substitute for, my concurrently pending application filed February 16th, 1903, Serial Number 143,642 in which there is shown and described a high candle power incandescent lamp, form of filament, inclosing hood, reflecting surfaces therefor and corrugated reflector of the same form and arrangement set forth and summed up in the claims to which this application is confined, for producing and utilizing rays of light for therapeutic purposes.

Sunlight is so rich in ultra violet rays that, before it can be directed for a sufficient length of time upon any malignant or deep seated disease possibly destroying their germs, it inevitably produces erythemia, a diffused inflammation, commonly designated as "sunburn," painfully and seriously aggravating and not infrequently more dangerous than the disease itself, and, therefore, the impossibility of utilizing the combined rays of the sun, for the destruction of the germs of skin disease, and particularly of malignant diseases of any kind, has long been recognized.

Light from clusters of commonly used incandescent and other lamps, although a good substitute for hot water bags, bricks, etc., for relieving pain and producing perspiration, has never been successfully used to destroy any chronic disease of the skin and much less the germs of any malignant disease because of the insufficient intensity of the rays due to low candle power.

When Finsen found the germs of lupus, (tuberculosis of the skin) were destroyed by isolated violet rays of light directed and concentrated by passing them through a crystal pressed against the diseased tissues thereof, he was the first to discover that light contained so much as a single ray capable of destroying the germs of even one of the most superficial of numerous malignant diseases, and the first to discover any means by which it is possible to successfully utilize any ray of light for the destruction of malignant disease of any kind or character, although sunlight had long before been known to contain all rays of light and heat necessary for sustaining and maintaining both health and life in human beings.

Violet rays of light have so little penetrative force that they are not destructive of the germs of lupus until concentrated and directly conducted to contact with the germs of lupus by a crystal firmly pressed thereon, and while on the other hand the X-rays subsequently discovered by Roentgen pass entirely through the body, and to a limited degree through the deep-seated bones thereof in the absence of any medium, and are destructive of lupus, and furthermore, retard the growth of germs of epithelioma, the most superficial of a large variety of incipient cancers when of small area, and which the violet rays will not, the X-rays will not entirely destroy cancer germs at any stage of that disease. The use of the X-rays, however, is infrequently resorted to as a remedy for the germs of any skin diseases because frequently liable, for causes unknown, to set up an incurable progressive breaking down of healthy tissues, which starting at the finger tips has been known to eventually destroy the arm and finally the life of the sufferer, notwithstanding repeated skilful surgical operations in effort to retard its progress, and in other cases to produce less progressive incurable ulcerations.

My discovery, demonstrated by long and frequent practice upon a great variety of diseases and particularly malignant diseases, is that a plurality of differing rays when combined in a high candle power light, poor in violet rays, will destroy the germs of malignant and other diseases with greater rapidity than will any isolated ray, and in the absence of any injury to healthy tissues; that as the number of differing rays combined are increased in a high candle power light, poor in ultra violet rays, the range of destruction of light is extended to the germs of deep seated malignant and also other diseases not destroyable by a less number of such rays, and that cauterization will not produce after inflammation, when all of the solar rays are combined in a light of the highest candle power poor in ultra violet rays, even when to a degree entirely destroying both the diseased and surrounding healthy tissues. Furthermore, that when an incandescent electric lamp of high power is combined and arranged within a hooded structure hereinafter described and claimed the rays of light project therefrom upon the diseased tissues of the human body, both the superficial and deep seated germs thereof are destroyed, in larger numbers and variety than heretofore, by simultaneously stimulating the capillaries, the hemoglobin of the blood to quickly give off and take up oxygen destroying the toxic matter of the blood, even to syphilis, and rapidly increasing the red blood corpuscles to a degree promoting tissue metabolism, stimulating the absorbents to remove extraneous matter, producing counter-irritant effects, diverting the blood from the deep seated vessels, an analgetic effect through rapidly vibrating nerve centers, produce an anesthetic effect due to combined action of these several effects.

The object of my invention is therefore the production of means by which all of the rays of a high candle power light, poor in violet rays, may be projected within predetermined limits upon the diseased tissues of the human body, in a form appearing thereon as lines of greater illumination, with one or more brilliant spots therein of sufficient intensity to produce cauterization of small area of diseased tissues, when the source of light is held in close proximity thereto, and thereby destroy the germs of malignant diseases in varieties limited only by the sum of all the rays of light, poor in ultra violet rays, and without setting up inflammation.

More specifically stated the object of my invention is to utilize the rays of light, from a high candle power incandescent electric lamp, necessarily poor in ultra violet rays, by inclosing such lamp within a hooded structure provided with reflecting surfaces of such form and arrangement, that the rays of light projected therefrom may be confined within predetermined limits, and have the appearance, when directed upon the human body or other surface, of lines of greater illumination out of parallel with each other and one or more brilliant spots within said area of sufficient intensity to produce cauterization of diseased tissues when the lamp is held in close proximity to but not in contact therewith.

With these ends in view, my invention consists in certain features of novelty in the construction, combination and arrangement of parts, by which the said objects and certain other objects hereinafter appearing are attained, all as fully described with reference to the accompanying drawings, and more particularly pointed out in the claims.

In the drawings: Figure 1 illustrates a central vertical section of an incandescent lamp for therapeutic purposes, with the lamp shown in full lines, embodying my invention and illustrating the latest details tending to perfect its construction; and, Fig. 2, a diagrammatic illustration of the form and arrangement of the rays projected by the lamp upon the human body.

Similar letters and numerals of reference indicate the same parts in the different views of the drawings.

A indicates an incandescent electric lamp, which for superficial malignant diseases may be from 100 to 300 candle power but for either superficial or deep seated malignant diseases, should be from 300 to 500 candle power and upwards. The lamp A is inclosed by a hooded structure B consisting of a cone 1 below which the lamp A partly projects into a cylindrical casing 2, secured to the base of the cone and provided at one side with a handle 3 for manipulating the lamp from a swinging position, and with an opening 4 to enable the operator to inspect and determine during the course of the treatment of the patient, the desired extent, character and intensity thereof, which for convenience is designated a "director" because it gives direction to the rays upon the patient. The lamp A is designed to represent either a 300 or 500 candle power or upwards, and is of the ordinary construction of high power lamps upon the market.

At a point between the neck extremity and the bulb end of the lamp is a reflector 5 annular in form and substantially filling the space between the lamp and the sides of the cone 1 as shown, which reflector may extend at a right angle to a vertical line through the lamp, but as shown is preferably inclined, and should be so constructed as to coöperate with the cone reflecting surface to render the rays of greater brilliancy than they would otherwise have. The reflector 5 is preferably provided with a number of circular corrugations 6 curved in cross-section and equal distances apart, and for the best effects not less than five in number, although it would be no substantial departure from my invention to have these corrugations angular in cross-section and of less number, notwithstanding that long and frequent experiments demonstrate that a less number do not produce quite so good therapeutic effects as the number shown.

The form of the reflecting surfaces of the hood as a whole and the relative arrangement of the lamp thereto are such that the light projected from the hood against an opposing surface appears to the eye to be in the form of a number of lines out of parallel with some of the lines crossing each other and at their point of crossing forming one or more brilliant spots which, in therapeutic effect as compared with the lines uncrossed, are concentrations of light and heat desirable and necessary in certain cases, not only for quickly relieving a patient for the time being by vigorously exposing a small area of diseased tissue thereto, but for quickly destroying by cauterization certain diseases, such, for example, as lupus (tuberculosis of the skin), and also epithelioma, (skin cancer), particularly when the germs thereof are in such parts in small area or areas that such a seemingly heroic treatment is required in order to prevent, as quickly as possible, their spreading or escaping destruction due to the lesser intensity produced by the heat and light from the separate lines. In other words, the further concentration of light and heat produced by the crossing of the lines is not only desirable to, in certain cases, quickly relieve a patient either for the time being or for subsequent purposes, but necessary for vigorously treating small areas of diseased tissues, and for quickly destroying by cauterization, certain diseases, such for example, as lupus (tuberculosis of the skin) and also epithelioma (skin cancer) particularly when the germs thereof are in such numbers in a small area or areas, as to require this seemingly heroic treatment in order to prevent their spreading, or possibly escaping destruction if subjected to rays of less intensity.

The lamp A may be suspended in the hood as shown, and electrically connected with a suitable source of electric supply by any desired ordinary means adapted for the purpose, for so far as my invention is concerned, and as previously disclosed herein, it is immaterial as to just what means of suspension and electrical connection are employed, so long as the lamp is held within the hood in substantially the position indicated in the drawing and is furnished with an electric current sufficient for the purposes described.

The best means so far devised, and which are approved by the board of underwriters for suspending and electrically connecting the lamp, consists in providing the upper end of the cone with an annular flange 7 and inclosing the sheet-metal cone with a stopper-like piece of porcelain 8, the lip of which opposes the underside of the annular flange 7. The underside of the porcelain stopper 8 is recessed, that is held out to receive and thereby prevent lateral movement of a porcelain disk 9, between which and the stopper 8 is a sheet of asbestos 10 for insulating purposes. Passing through both this porcelain stopper and disk and the layer of asbestos, are bolts 11 preferably four in number, equal distances apart adjacent the upper side of the stopper 8 with washers 12, and adjacent the lower side of the disk 9 with washers 13—13, two of which bolts 11, as indicated in the drawing, are provided at opposite ends with thumb-nuts 14, which, together with the washers, serve to clamp on the inside of the disk 9, the insulated wires 15—15 of the lamp, and electrically connect said wires with wires 16—16 leading to the source of electrical supply for the lamp.

Embracing the contracted portion of the neck of the lamp A are spring tongues 17 sufficient in number and distributed so as to embrace and hold and sustain the weight of the lamp when surrounded by a circular coiled-spring 18, the upper end of these tongues being bent to form what has before been designated as and may be washers 13—13.

The stopper 8 is designed to be fitted tightly within and against the upper end of the cone and to thereby form in connection with the reflector 5, a dead air chamber for the purposes of preventing the burning of the insulation of the wires of the lamp and also to reduce as far as may be heating the upper part of the cone, when the lamp is in use.

Surmounting the flange 7 of the cone is an inverted cup-shaped piece of porcelain 19 secured to the flange 7 by bolts, not shown, and having a bushing 20, to which is screwed a four-way tubing 21 in the upper end of which, by a screw-plug 22, is secured a ring 23 by which to hang the lamp by means of a cable enabling it to be swung into the varied desired positions when in use, the horizontal arms of the four-way tube being also provided with insulating bushings 24, through which the wires 20 are respectively projected for the purposes of their connection to a cable or line wire leading to a source of supply. The cup 19 provides a chamber connecting with the four-way passage in the tubing, and a means for forming a dead air space of sufficient degree preventing the heat from burning the wires 16—16 and particularly their insulating covers.

The bolts 11 may be and are prevented from burning by means of nuts 25, square or of irregular form, depressed in recesses formed in the stopper 8 and the wires 13—13 are prevented from crossing or short-circuiting by reason of any turning of the lamp or the hood and against the possibility of any such occurrence, by means of a porcelain block 26 projecting down between the wires 13 and preferably suspended in this position by a screw-bolt 27 passing through the stopper 8 and disk 9 with its lower end secured to the block and tightened by a nut 28 countersunk in the upper face of the stopper.

While these details of devices and their arrangement for suspending the lamp within the hood and for preventing the wires and their insulations from being charred or destroyed, are shown and described, they in no wise modify or change my invention so far as claimed herein, for my invention will be none the less present in a structure not showing these details, when any other common and well-known means are employed to sustain the lamp, the hood and the reflector in their operative positions as shown, nor if the dead air space between the reflector and the stopper is omitted, and the upper portion of the cone is open by perforations or otherwise. For operation, these lamps are usually suspended by an overhead cable and counterbalanced by a weight, so as to be convenient of manipulation over the patient, preferably in a lying down position, stripped of clothing, the lamp first being held some distance above the patient and gradually brought nearer to him as the treatment proceeds and which may be done without inconvenience, owing to the anesthetic effect of the heat, while in the meantime the operator regulates the heat as desired or necessary, and which he is enabled to do by looking through the peep-hole 4.

The peep-hole is particularly necessary when the hood is brought down very low and particularly for the purpose of cauterizing when it is necessary for the operator to be able to lower the lamp so as to bring the concentrating points produced by the crossing of the beams directly upon the spot to be cauterized, and to watch its progress so as to determine when to cease cauterization.

In conclusion it is proper at this point to state that I am the first to employ for any purposes, and particularly for therapeutic purposes an incandescent light of great heat and light-giving power secured in a hood flexibly suspended and provided with reflecting surfaces, one of which is arranged about the neck of the lamp and forming with the others a continuous reflecting surface adapted to project the heat and light rays from the hood and confine said projected rays within a predetermined area.

Having described my invention what I claim and desire to secure by Letters Patent is, 1. In a therapeutic lamp, a combined hood and director, an incandescent lamp of great heat and light giving power suspended in said hood, and a transverse reflector arranged about the lamp at a point between the extreme ends thereof.

2. In a therapeutic lamp, a combined hood and director, an incandescent lamp of great heat and light giving power suspended in said hood, and a corrugated reflector arranged about the lamp at a point below the upper end of the neck of the same.

3. In a therapeutic lamp, a combined hood and director, an incandescent lamp of great heat and light-giving power secured to the apex of said hood, a reflector arranged in the upper part of the hood and about the neck of the lamp, the reflector, hood and director forming a continuous reflecting surface, and means for flexibly suspending said lamp.

4. In a therapeutic lamp, a combined hood and reflector, a director secured to the hood and forming a continuation thereof, an incandescent lamp of great heat and light-giving power secured axially in said hood, a reflector arranged in the upper part of the hood and about the neck of the lamp, the reflector hood, and director forming a continuous reflecting surface, and means for flexibly suspending said lamp.

5. In a therapeutic lamp, a combined hood and director, an incandescent lamp of great heat and light-giving power secured to the apex of said hood, a reflector arranged in the upper part of the hood and about the neck of the lamp, the reflector, hood and director forming a continuous reflecting surface, means for flexibly suspending the lamp, and a handle for controlling it.

6. In a therapeutic lamp, a combined hood and reflector, a director secured to the hood and forming a continuation thereof, an incandescent lamp of great heat and light-giving power secured axially in said hood, a reflector arranged in the upper part of the hood and about the neck of the lamp, the reflector, hood and director forming a continuous reflecting surface, means for flexibly suspending said lamp, and a handle thereon for controlling it.

7. In a therapeutic lamp, a combined hood and director, an incandescent lamp of great heat and light-giving power secured in the apex of said hood, a reflector arranged in the hood and about the neck of the lamp, the reflector, hood and director forming a continuous reflecting surface, and means for flexibly suspending said lamp.

8. In a therapeutic lamp, a combined hood and director, an incandescent lamp of great heat and light-giving power secured in the apex of said hood, and a reflector arranged in the hood and about the neck of the lamp, the reflector, hood and director forming a continuous reflecting surface.

9. In a therapeutic lamp, a combined hood and director, an incandescent lamp of great heat and light-giving power secured in said hood, a reflector arranged in the hood and about the neck of the lamp, the reflector, hood and director forming a continuous reflecting surface, and means for flexibly suspending said lamp.

10. In a therapeutic lamp, a combined hood and director, an incandescent lamp of great heat and light-giving power secured in said hood, and a reflector arranged in the hood and about the neck of the lamp, the reflector, hood and director forming a continuous reflecting surface.

CORYDON E. ROGERS.

Witnesses:
JNO. G. ELLIOTT,
M. S. REEDER.